US009037193B2

(12) United States Patent
Vergnes et al.

(10) Patent No.: US 9,037,193 B2
(45) Date of Patent: May 19, 2015

(54) METHOD FOR SWITCHING BETWEEN A FIRST AND A SECOND LOGICAL UICCS COMPRISED IN A SAME PHYSICAL UICC

(75) Inventors: Fabrice Vergnes, Fuveau (FR); Nicolas Mathian, Aubagne (FR)

(73) Assignee: GEMALTO SA, Meudon (FR)

(*) Notice: Subject to any disclaimer, the term of this patent is extended or adjusted under 35 U.S.C. 154(b) by 130 days.

(21) Appl. No.: 13/991,752

(22) PCT Filed: Dec. 5, 2011

(86) PCT No.: PCT/EP2011/071731
§ 371 (c)(1),
(2), (4) Date: Oct. 18, 2013

(87) PCT Pub. No.: WO2012/076461
PCT Pub. Date: Jun. 14, 2012

(65) Prior Publication Data
US 2014/0031083 A1 Jan. 30, 2014

Related U.S. Application Data

(63) Continuation of application No. 13/312,309, filed on Dec. 6, 2011.

(30) Foreign Application Priority Data

Dec. 6, 2010 (EP) .................................. 10306359

(51) Int. Cl.
*H04B 1/38* (2006.01)
*H04W 12/08* (2009.01)
(Continued)

(52) U.S. Cl.
CPC .............. *H04W 12/08* (2013.01); *H04W 4/001* (2013.01); *H04W 4/003* (2013.01); *H04W 8/18* (2013.01);
(Continued)

(58) Field of Classification Search
USPC .......................... 455/414.1, 422.1, 550.1, 558
See application file for complete search history.

(56) References Cited

U.S. PATENT DOCUMENTS 7,024,390 B1   4/2006 Mori et al.
7,146,161 B2 * 12/2006 Chou ............................ 455/558
(Continued)

FOREIGN PATENT DOCUMENTS

DE   10 2008 033 976 A1   1/2010
EP        1 650 717 A1   4/2006
(Continued)

OTHER PUBLICATIONS

International Search Report (PCT/ISA/210) issued on Apr. 4, 2012, by the European Patent Office as the International Searching Authority for International Application No. PCT/EP2011/071731.
(Continued)

*Primary Examiner* — Quochien B Vuong
(74) *Attorney, Agent, or Firm* — Buchanan Ingersoll & Rooney PC

(57) ABSTRACT

A method for switching between first and second logical UICCs in the same physical UICC. Each logical UICC has an area for storing overlapped volatile data and an area for storing overlapped persistent data. The physical UICC also has an OS area. When a switch order is received to switch from the first logical UICC to the second logical UICC. Overlapped volatile data from the OS area is backed up to the area for storing overlapped volatile data of the first logical UICC. Overlapped persistent data from the OS area is backed up to the area for storing overlapped persistent data of the first logical UICC. Volatile data from the area for storing overlapped volatile data from the second logical UICC is restored to the OS area. Persistent data from the area for storing overlapped persistent data from the second logical UICC is restored to the OS area.

1 Claim, 1 Drawing Sheet

(51) Int. Cl.
  *H04W 4/00*     (2009.01)
  *H04W 12/06*    (2009.01)
  *H04L 29/08*    (2006.01)
  *H04L 9/08*     (2006.01)
  *H04W 8/22*     (2009.01)
  *H04W 8/18*     (2009.01)
  *H04W 8/20*     (2009.01)
  *H04W 12/04*    (2009.01)
  *H04L 29/06*    (2006.01)

(52) U.S. Cl.
  CPC .............. *H04W 8/205* (2013.01); *H04W 4/005* (2013.01); *H04W 12/04* (2013.01); *H04L 63/083* (2013.01); *H04W 12/06* (2013.01); *H04L 67/34* (2013.01); *H04L 9/0825* (2013.01); *H04W 8/22* (2013.01); *H04W 8/183* (2013.01); *H04B 1/3816* (2013.01)

(56) References Cited

U.S. PATENT DOCUMENTS

| | | | |
|---|---|---|---|
| 7,349,719 B2 * | 3/2008 | Buniatyan | 455/414.1 |
| 7,363,056 B2 | 4/2008 | Faisy | |
| 2002/0186845 A1 | 12/2002 | Dutta et al. | |
| 2004/0131186 A1 | 7/2004 | Kasuya et al. | |
| 2004/0235523 A1 * | 11/2004 | Schrire et al. | 455/558 |
| 2005/0021875 A1 | 1/2005 | Bouthemy et al. | |
| 2005/0164737 A1 | 7/2005 | Brown | |
| 2005/0186954 A1 | 8/2005 | Kenney | |
| 2005/0239504 A1 | 10/2005 | Ishii et al. | |
| 2005/0266883 A1 | 12/2005 | Chatrath | |
| 2006/0049243 A1 | 3/2006 | Sakamura et al. | |
| 2006/0079284 A1 | 4/2006 | Lu et al. | |
| 2006/0086785 A1 | 4/2006 | Sakata | |
| 2006/0199614 A1 * | 9/2006 | Hyacinthe | 455/558 |
| 2007/0105532 A1 * | 5/2007 | Martin et al. | 455/558 |
| 2007/0239857 A1 | 10/2007 | Mahalal et al. | |
| 2008/0090614 A1 | 4/2008 | Sicher et al. | |
| 2008/0130879 A1 | 6/2008 | Heinonen et al. | |
| 2008/0261561 A1 | 10/2008 | Gehrmann | |
| 2009/0159692 A1 | 6/2009 | Chew et al. | |
| 2009/0163175 A1 | 6/2009 | Shi et al. | |
| 2009/0191857 A1 | 7/2009 | Horn et al. | |
| 2009/0191917 A1 | 7/2009 | Zappulla et al. | |
| 2009/0191918 A1 | 7/2009 | Mardiks | |
| 2009/0215431 A1 | 8/2009 | Koraichi | |
| 2009/0217348 A1 | 8/2009 | Salmela et al. | |
| 2010/0179907 A1 | 7/2010 | Atkinson | |
| 2011/0035584 A1 | 2/2011 | Meyerstein et al. | |
| 2011/0059773 A1 | 3/2011 | Neumann et al. | |
| 2011/0126183 A1 | 5/2011 | Bernard et al. | |
| 2011/0136482 A1 | 6/2011 | Kaliner | |
| 2011/0237190 A1 | 9/2011 | Jolivet | |
| 2011/0302641 A1 | 12/2011 | Hald et al. | |
| 2011/0320600 A1 | 12/2011 | Froeding et al. | |
| 2012/0028609 A1 | 2/2012 | Hruska | |
| 2012/0190354 A1 | 7/2012 | Merrien et al. | |
| 2013/0318355 A1 | 11/2013 | Girard et al. | |
| 2013/0324091 A1 | 12/2013 | Girard et al. | |
| 2013/0329683 A1 | 12/2013 | Berard et al. | |
| 2014/0019760 A1 | 1/2014 | Vergnes et al. | |
| 2014/0024343 A1 | 1/2014 | Bradley | |
| 2014/0057680 A1 | 2/2014 | Proust et al. | |
| 2014/0066011 A1 | 3/2014 | Bradley | |
| 2014/0122872 A1 | 5/2014 | Merrien et al. | |
| 2014/0141747 A1 | 5/2014 | Merrien et al. | |

FOREIGN PATENT DOCUMENTS

| | | | |
|---|---|---|---|
| EP | 1 965 596 A1 | 9/2008 | |
| EP | 2 056 523 A1 | 5/2009 | |
| EP | 2 076 071 A1 | 7/2009 | |
| FR | 2 871 020 A1 | 12/2005 | |
| JP | 2002-236572 A | 8/2002 | |
| JP | 2005-323128 A | 11/2005 | |
| JP | 2006-050554 A | 2/2006 | |
| JP | 2006-107316 A | 4/2006 | |
| JP | 2008-519343 A | 6/2008 | |
| JP | 2010-501092 A | 1/2010 | |
| JP | 2010-532107 A | 9/2010 | |
| JP | 2011-525311 A | 9/2011 | |
| JP | 2012-528534 A | 11/2012 | |
| KR | 2002-0066032 A | 8/2002 | |
| KR | 2003-0044260 A | 6/2003 | |
| KR | 10-0489783 B1 | 5/2005 | |
| KR | 10-2005-0095424 A | 9/2005 | |
| KR | 10-2009-0056019 A | 6/2009 | |
| KR | 10-2010-011642 A | 10/2010 | |
| WO | 02/082715 A1 | 10/2002 | |
| WO | 03/104997 A1 | 12/2003 | |
| WO | 2004/021296 A1 | 3/2004 | |
| WO | 2007/058241 A1 | 5/2007 | |
| WO | 2008/128874 A1 | 10/2008 | |
| WO | WO 2008/123827 A1 | 10/2008 | |
| WO | 2009/055910 A1 | 5/2009 | |
| WO | 2009091837 A1 | 7/2009 | |
| WO | 2009/095295 A1 | 8/2009 | |
| WO | 2009/103623 A2 | 8/2009 | |
| WO | 2009/141024 A1 | 11/2009 | |
| WO | 2009/141035 A1 | 11/2009 | |
| WO | 2009/149788 A2 | 12/2009 | |
| WO | 2010/138592 A2 | 12/2010 | |
| WO | 2011139795 A1 | 11/2011 | |
| WO | 2011159549 A1 | 12/2011 | |
| WO | 2012012526 A1 | 1/2012 | |
| WO | 2012058092 A1 | 5/2012 | |
| WO | 2012058099 A1 | 5/2012 | |
| WO | 2012058429 A2 | 5/2012 | |
| WO | 2012058446 A1 | 5/2012 | |
| WO | 2012058450 A1 | 5/2012 | |
| WO | 2012061516 A1 | 5/2012 | |
| WO | 2012061561 A2 | 5/2012 | |
| WO | 2012065112 A2 | 5/2012 | |

OTHER PUBLICATIONS

Written Opinion (PCT/ISA/237) issued on Apr. 4, 2012, by the European Patent Office as the International Searching Authority for International Application No. PCT/EP2011/071731.

3$^{rd}$ Generation Partnership Project; Technical Specification Group Services and System Aspects; Service Aspects; Service principles (Release 11), 3GPP TS 22,101, V11.0.0, Oct. 1, 2010, pp. 1-60.

Partial European Search Report issued on Jul. 22, 2011, by the European Patent Office in the European Application No. 10 30 6359. (7 pages).

An English Translation of the Office Action (Notice of Reasons for Rejection) issued on Apr. 15, 2014, by the Japan Patent Office in the Japanese Patent Application No. 2013-542477. (3 pages).

"3rd Generation Partnership Project; Technical Specification Group Services and System Aspects; 3G Security; Specification of the MILENAGE Algorithm Set; An example algorithm set for the 3GPP authentication and key generation functions f1, f1*, f2, f3, f4, f5 and f5*; Document 2: Algorithm Specification (Release 11)", 3GPP TS 35.206 V11.0.0 (Sep. 2012), pp. 1-31.

International Search Report (Form PCT/ISA/210) and the Written Opinion of the International Searching Authority (Form PCT/ISA/237) issued on Feb. 22, 2012, by the European Patent Office in the International Application No. PCT/EP2011/071674. (8 pages).

"3rd Generation Partnership Project; Technical Specification Group Services and System Aspects; Feasibility Study on Remote Management of USIM Application on M2M Equipment; (Release 8)", 3GPP TR 33.812 V1.0.0 (Sep. 2008), pp. 1-80.

International Search Report (Form PCT/ISA/210) and the Written Opinion of the International Searching Authority (Form PCT/ISA/237) issued on Feb. 27, 2012, by the European Patent Office in the International Application No. PCT/EP2011/071660. (6 pages).

An English Translation of the Office Action (Notice of Reasons for Rejection) issued on Jun. 17, 2014, by the Japan Patent Office in the Japanese Patent Application No. 2013-542492. (3 pages).

(56) References Cited

OTHER PUBLICATIONS

Madlmayr et al., "The Benefit of using SIM Application Toolkit in the Context of Near Field Communication Applications" International Conference on the Management of Mobile Business, (Jul. 2007), (8 pages).
An English Translation of the Office Action (Notice of Reasons for Rejection) issued on Apr. 30, 2014, by the Japan Patent Office in the Japanese Patent Application No. 2013-542496. (2 pages).
International Search Report (Form PCT/ISA/210) and the Written Opinion of the International Searching Authority (Form PCT/ISA/237) issued on Feb. 15, 2012, by the European Patent Office in the International Application No. PCT/EP2011/071778. (9 pages).
International Search Report (Form PCT/ISA/210) and the Written Opinion of the International Searching Authority (Form PCT/ISA/237) issued on Feb. 27, 2012, by the European Patent Office in the International Application No. PCT/EP2011/071781. (11 pages).
International Search Report (Form PCT/ISA/210) and the Written Opinion of the International Searching Authority(Form PCT/ISA/237) issued on Mar. 28, 2012, by the European Patent Office in the International Application No. PCT/EP2011/071737. (6 pages).
International Search Report (Form PCT/ISA/210) and the Written Opinion of the International Searching Authority (Form PCT/ISA/237) issued on Apr. 16, 2012, by the European Patent Office in the International Application No. PCT/EP2011/071919. (7 pages).
International Search Report (Form PCT/ISA/210) and the Written Opinion of the International Searching Authority (Form PCT/ISA/237) issued on Feb. 27, 2012, by the European Patent Office in the International Application No. PCT/EP2011/071664. (8 pages).
Written Opinion of the International Preliminary Examining Authority (Form PCT/IPEA/408) issued on Dec. 13, 2012, by the European Patent Office in the International Application No. PCT/EP2011/071664. (5 pages).
Notification of Transmittal of the International Preliminary Report on Patentability (Forms PCT/IPEA/416 and PCT/IPEA/409) issued on Mar. 8, 2013, by the European Patent Office in the International Application No. PCT/EP2011/071664. (14 pages).
International Search Report (Form PCT/ISA/210) and the Written Opinion of the International Searching Authority (Form PCT/ISA/237) issued on Apr. 12, 2012, by the European Patent Office in the International Application No. PCT/EP2011/071695 and comments filed by the Applicant on May 31, 2012. (10 pages).
International Search Report (Form PCT/ISA/210) and the Written Opinion of the International Searching Authority (Form PCT/ISA/237) issued on Apr. 5, 2012, by the European Patent Office in the International Application No. PCT/EP2011/071785. (9 pages).
Vergnes et al., U.S. Appl. No. 13/992,103, entitle "Method for Exporting Data of a Javacard Application Stored in a UICC to a Host" filed Jun. 6, 2013.

Office Action issued by the U.S. Patent and Trademark Office in the U.S. Appl. No. 13/312,309, mailed Sep. 25, 2013, U.S. Patent and Trademark Office, Alexandria, VA. (13 pages).
Office Action issued by the U.S. Patent and Trademark Office in the U.S. Appl. No. 13/312,309, mailed Apr. 24, 2014, U.S. Patent and Trademark Office, Alexandria, VA. (13 pages).
"IP Based Over-the Air Handset Configuration Management (IOTA-HCM), 3rd Generation Partnership Project 2 3GPP2", 3GPP2 C.S0040, Version 1.0, Jul. 18, 2003, pp. 1-68.
"Smart Cards; Card Application Toolkit (CAT) (Release 9)", ETSI TS 102 223, vol. SCP TEC, No. V9.2.0, (Oct. 1, 2010), pp. 1-209.
International Search Report (Form PCT/ISA/210) and the Written Opinion of the International Searching Authority (Form PCT/ISA/237) issued on Feb. 22, 2012, by the European Patent Office in the International Application No. PCT/EP2011/071675. (12 pages).
Office Action (Notice of Reasons for Rejection) issued on Aug. 19, 2014, by the Japan Patent Office in Japanese Patent Application No. 2013-542497, and an English Translation of the Office Action. (9 pages).
Office Action (Notice of Preliminary Rejection) issued on Jun. 27, 2014, by the Korean Intellectual Property Office, in Korean Patent Application No. 10-2013-7017637, and an English Translation of the Office Action. (7 pages).
Office Action (Notice of Preliminary Rejection) issued on Aug. 19, 2014, by the Korean Intellectual Property Office in Korean Patent Application No. 10-2013-7016486, and an English Translation of the Office Action. (6 pages).
Office Action (Notice of Reasons for Rejection) issued on Aug. 5, 2014, by the Japan Patent Office in Japanese Patent Application No. 2013-542474, and an English Translation of the Office Action. (4 pages).
Office Action issued by the U.S. Patent and Trademark Office in the U.S. Appl. No. 13/991,823, mailed Jan. 5, 2015, U.S. Patent and Trademark Office, Alexandria, VA. (25 pages).
Office Action issued by the U.S. Patent and Trademark Office in the U.S. Appl. No. 13/991,846, mailed Feb. 10, 2015, U.S. Patent and Trademark Office, Alexandria, VA. (26 pages).
Office Action issued by the U.S. Patent and Trademark Office in the U.S. Appl. No. 13/992,065, mailed Dec. 18, 2014, U.S. Patent and Trademark Office, Alexandria, VA. (26 pages).
Office Action issued by the U.S. Patent and Trademark Office in the U.S. Appl. No. 13/991,744, mailed Dec. 12, 2014, U.S. Patent and Trademark Office, Alexandria, VA. (33 pages).
Office Action issued by the Korean Patent Office on Feb. 25, 2015 in corresponding Korean Application No. 10-2013-7017638, and English language translation of Office Action. (7 pages).
U.S. Office Action issued on Mar. 17, 2015 in copending U.S. Appl. No. 13/991,766. (33 pages).
U.S. Office Action issued on Mar. 17, 2015 in copending U.S. Appl. No. 13/992,039. (34 pages).

* cited by examiner

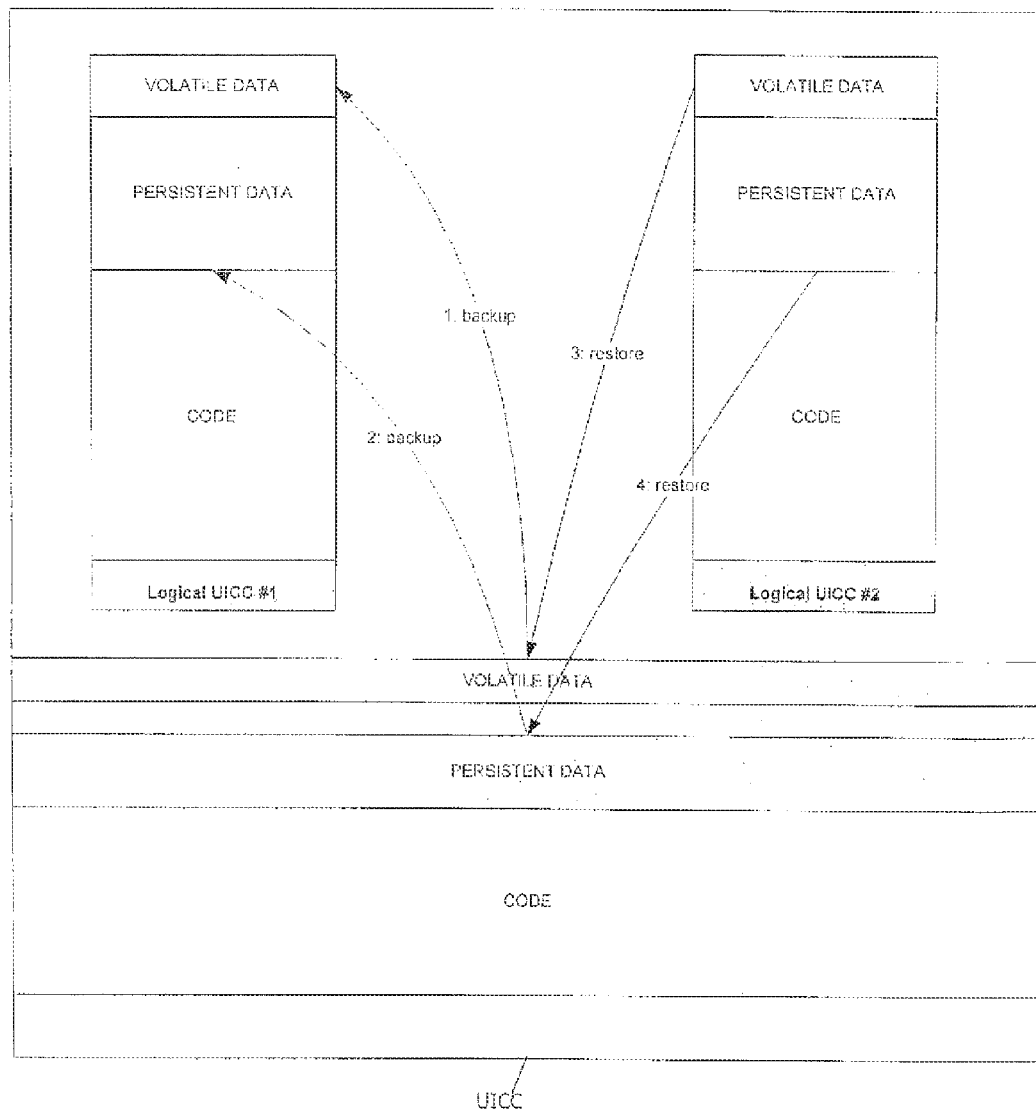

US 9,037,193 B2

1

METHOD FOR SWITCHING BETWEEN A FIRST AND A SECOND LOGICAL UICCS COMPRISED IN A SAME PHYSICAL UICC

This disclosure is a national phase of PCT/EP2011/071731, filed Dec. 5, 2011, a continuation of U.S. application Ser. No. 13/312,309, filed Dec. 6, 2011, and claims priority to European Application No. 10306359.0, filed Dec. 6, 2010, the disclosures of which are hereby incorporated by reference.

The present invention concerns a method for switching between a first and a second logical UICCs comprised in a same physical UICC. A UICC (Universal Integrated Circuit Card) is a secure element embedding Sim applications for telecommunication purposes. A secure element can be installed, fixedly or not, in a terminal, like for example a mobile phones. In some cases, the terminals are constituted by machines that communicate with other machines for M2M (Machine to Machine) applications.

A UICC can be in the format of a smart card, or may be in any other format such as for example but not limited to a packaged chip as described in PCT/SE2008/050380, or any other format. It can be used in mobile terminals in GSM and UMTS networks for instance. The UICC ensures network authentication, integrity and security of all kinds of personal data.

In a GSM network, the UICC contains mainly a SIM application and in a UMTS network it is the USIM application. A UICC may contain several other applications, making it possible for the same smart card to give access to both GSM and UMTS networks, and also provide storage of a phone book and other applications. It is also possible to access a GSM network using an USIM application and it is possible to access UMTS networks using a SIM application with mobile terminals prepared for this. With the UMTS release 5 and later stage network like LTE, a new application, the IP multimedia Services Identity Module (ISIM) is required for services in the IMS (IP Multimedia Subsystem). The telephone book is a separate application and not part of either subscription information module.

In a CDMA network, the UICC contains a CSIM application, in addition to 3GPP USIM and SIM applications. A card with all three features is called a removable user identity card, or R-UIM. Thus, the R-UIM card can be inserted into CDMA, GSM, or UMTS handsets, and will work in all three cases.

In 2G networks, the SIM card and SIM application were bound together, so that "SIM card" could mean the physical card, or any physical card with the SIM application.

The UICC smart card consists of a CPU, ROM, RAM, EEPROM and I/O circuits. Early versions consisted of the whole full-size (85×54 mm, ISO/IEC 7810 ID-1) smart card. Soon the race for smaller telephones called for a smaller version of the card.

Since the card slot is standardized, a subscriber can easily move their wireless account and phone number from one handset to another. This will also transfer their phone book and text messages. Similarly, usually a subscriber can change carriers by inserting a new carrier's UICC card into their existing handset. However, it is not always possible because some carriers (e.g. in U.S.) SIM-LOCK the phones that they sell, thus preventing competitor carriers' cards being used.

The integration of the ETSI framework and the Application management framework of Global Platform is standardized in the UICC configuration.

UICCs are standardized by 3GPP and ETSI.

A UICC can normally be removed from a mobile terminal, for example when the user wants to change his mobile termi-

2 nal. After having inserted his UICC in his new terminal, the user will still have access to his applications, contacts and credentials (network operator).

It is also known to solder or weld the UICC in a terminal, in order to get it dependent of this terminal. This is done in M2M (Machine to Machine) applications. The same objective is reached when a chip (a secure element) containing the SIM or USIM applications and files is contained in the terminal. The chip is for example soldered to the mother-board of the terminal or machine and constitutes an e-UICC.

The present invention applies also to such soldered UICCs or to such chips containing the same applications than the chips comprised in UICCs. A parallel can be done for UICCs that are not totally linked to devices but that are removable with difficulty because they are not intended to be removed, located in terminals that are distant or deeply integrated in machines. A special form factor of the UICC (very small for example and therefore not easy to handle) can also be a reason to consider it as in fact integrated in a terminal. The same applies when a UICC is integrated in a machine that is not intended to be opened.

In the next description, welded UICCs or chips containing or designed to contain the same applications than UICCs will generally be called embedded UICCs or embedded secure elements (in contrast to removable UICCs or removable secure elements). This will also apply to UICCs or secure elements that are removable with difficulty.

The invention concerns a warm switch between logical UICCs.

An UICC is:

1) a physical component compliant to a standardized form factor (e.g. 3FF) embedding a chip 2) A smartcard Operating System executed on the chip providing standard services: answer to ISO7816-3 reset, answers to standardized APDUs sent by a reader, . . . .

3) A set of applications executed on the chip providing answers to APDU defined by application provider 4) A set of personal data (e.g. phonebook, UICCID, IMSI) stored in the physical memory of the chip used by the smartcard OS 5) A set of secret data (keys and PINs) stored securely in a physical memory of the chip and used by the smartcard OS to provide secure services.

In this invention, the physical component is the Physical UICC.

This Physical UICC can emulate several UICCs, each one having the behaviour described in 2) and 3), storing sets described in 4) and 5). This service is provided by embedding in the chip the 2), 3), 4) and 5) of each UICC emulated. An emulated UICC is hereinafter called 'Logical' UICC. Because of physical memory constraints (technology of the memory, limited amount of volatile and persistent memory) and Operating System constraints, part of the volatile and persistent data of different 'Logical' UICC are stored in the same location when they are executed. These parts of data are called overlapped volatile data and overlapped persistent data. This is the case, for example, for the volatile data of the 'Logical' UICC: they are stored in the limited amount of volatile memory of the physical UICC during the 'Logical' UICC execution time.

The UICC card can be considered from the external world (e.g. reader) as anyone of the 'logical' UICC that it emulates.

The invention proposes a mechanism that allows fast and smart switching between logical UICCs.

In the state of the art, the basic behaviour to switch from a first 'logical' UICC to another one is to reset the (physical) UICC, and after the ISO7816-3 reset, execute the Operating System of the newly selected 'logical' UICC. During the reset, the volatile memory of the physical UICC is cleared and all volatile data of the first 'logical' UICC is lost. After this reset, the software of the 'logical' UICC is executed (as today in a usual UICC) from scratch: a complete activation sequence shall be performed by the reader. It is requested by 2) and 3) to initialize its volatile data in order to set up the applicative and system contexts. The volatile data of the newly selected 'logical' UICC are stored in the volatile memory of the physical UICC, at the same location used by the previously selected 'logical' UICC.

The volatile context of the 'logical UICC' previously selected is however lost. If a service from this 'logical' UICC is requested again, the 'logical' UICC shall be selected again, and the complete activation sequence shall be performed again. This may take a while and limit the use cases to switch between two logical UICCs.

From the reader (terminal, for example mobile phone, PDA or tablet) point of view, this solution is 'natural': as the UICC is a removable device, the UICC could have been removed and a new one could have been inserted. Modification of the UICC behaviour after the reset is normal. From the 'logical UICC' point of the view, the Operating System is executed (started) from a Reset and this is the normal behaviour.

The present invention is a way to modify dynamically the contexts of 2) and 3) but avoid the initialization of volatile contexts.

The invention proposes a method for switching between a first and a second logical UICCs comprised in a same physical UICC. In order to perform the switch, specific areas are defined to manage the overlapped volatile data and overlapped persistent data, each logical UICC comprising an area for storing overlapped volatile data and an area for storing overlapped persistent data. The physical UICC comprises also an OS area comprising in operation, during the 'logical' UICC execution time, the overlapped volatile data and overlapped persistent data.

According to this invention, the method consists in, when a switch order is received to switch from the first logical UICC to the second logical UICC:

i—backup overlapped volatile data from OS area of the physical UICC to the area for storing overlapped volatile data of the first logical UICC ii—backup overlapped persistent data from OS area of the physical UICC to the area for storing overlapped persistent data of the first logical UICC iii—restore volatile data from the area for storing overlapped volatile data from the second logical UICC to the OS area for storing overlapped volatile data of the physical UICC iv—restore persistent data from the area for storing overlapped persistent data from the second logical UICC to the OS area for storing overlapped persistent data of the physical UICC.

Thanks to this invention, from the reader (terminal) point of view, there is no change of UICC card. There is also no need to perform the activation sequence after the switch between the logical UICCs.

The invention will be better understood by reading the following description of the FIG. 1 which represents a physical UICC comprising two logical UICCs between which a switch is performed.

The switch is performed thanks to a new design of 2) where the volatile contexts are backed-up and restored from/to persistent smartcard storage each time a warm switch is requested. Those persistent data are nevertheless cleared upon physical reset.

This creates a $3^{rd}$ kind of data in 2): volatile data persistent between logical UICC switches.

This switch operation can be performed each time an APDU is received. This APDU consists in a switch order to switch from the first logical UICC (UICC#1) to the second logical UICC (UICC#2). The UICC can be asked to switch from one logical UICC to another by several mechanisms. It may be a specific APDU command, an information set through the logical channel byte or any electric signal on the terminal/UICC interface (usage of a specific connector). The switch can also be automatic.

This mechanism can be entirely hidden from the reader (reader has no knowledge of 'logical' UICC switch).

Thanks to this invention, it is easy (fast and transparent for end user and terminal) to switch from one logical UICC providing some services to another one providing other services.

In the telecom market, for example, a physical UICC contains:
a first 'logical' UICC for a MNO 1 subscription
a second 'logical' UICC for a MNO 2 subscription
a third 'logical' UICC for banking services.

The physical UICC allows the end user to connect to two different radio networks (e.g. UMTS or CDMA networks), for example one network in France and the other one in USA. Usage of the invention allows benefiting from the banking services whatever MNO is selected.

FIG. 1 represents an UICC comprising two logical UICCs, a first logical UICC referenced UICC#1 and a second logical UICC referenced UICC#2. Each logical UICC comprises software (CODE), an area storing volatile data and an area storing persistent data. The UICC also comprises an area for storing volatile data (e.g. RAM) and an area for storing persistent data (e.g. NVM).

The method according to the present invention proposes to switch between logical UICC#1 and logical UICC#2. This switch can be automatically done, for example in view of the MNO used by a calling party. If the logical UICC currently used is UICC#1 and the calling party's MNO is the second operator, it is advantageous, for avoiding roaming costs, to switch to UICC#2. For that, an APDU is sent from the terminal enclosing the physical UICC (removable or not) to this physical UICC.

Four steps are represented in FIG. 1.

In this FIGURE, logical UICC#1 and logical UICC#2 are comprised on a physical UICC. Each logical UICC comprises an area for storing volatile data and an area for storing persistent data. The physical UICC comprises also an OS area comprising in operation volatile and persistent data. When a switch order is received to switch from the first logical UICC (UICC#1) to the second logical UICC (UICC#2), following steps are performed:

1. the volatile data from OS area of the physical UICC are backup to the area for storing volatile data of the first logical UICC
2. the persistent data from OS area of the physical UICC are backup to the area for storing persistent data of the first logical UICC
3. the volatile data from the area for storing volatile data from the second logical UICC are restored to the OS area for storing volatile data of the physical UICC
4. the persistent data from the area for storing persistent data from the second logical UICC are restored to the OS area for storing persistent data of the physical UICC.

The result of these operations is that logical UICC#2 is immediately ready to be used without terminal boot.

The invention claimed is:

1. Method for switching between a first and a second logical UICCs comprised in a same physical UICC and sharing during their execution time a common physical memory location for part of their volatile data, called overlapped volatile data, and part of their persistent data, called overlapped persistent data, each logical UICC comprising an area for storing overlapped volatile data and an area for storing overlapped persistent data, said physical UICC also comprising an area storing during logical UICC execution time overlapped volatile and overlapped persistent data, said method comprising, when a switch order is received to switch from said first logical UICC to said second logical UICC:
  i—backup volatile data from an OS area of said physical UICC to said area for storing overlapped volatile data of said first logical UICC;
  ii—backup persistent data from the OS area of said physical UICC to said area for storing overlapped persistent data of said first logical UICC;
  iii—restore volatile data from the area for storing overlapped volatile data from said second logical UICC to said OS area for storing volatile data of said physical UICC; and
  iv—restore persistent data from the area for storing overlapped persistent data from said second logical UICC to said OS area for storing persistent data of said physical UICC.

* * * * *